US008073353B2

(12) United States Patent
Murayama (10) Patent No.: US 8,073,353 B2
(45) Date of Patent: Dec. 6, 2011

(54) IMAGE FORMING APPARATUS

(75) Inventor: Kentaro Murayama, Kasugai (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 619 days.

(21) Appl. No.: 12/189,891

(22) Filed: Aug. 12, 2008

(65) Prior Publication Data
US 2009/0162112 A1 Jun. 25, 2009

(30) Foreign Application Priority Data
Dec. 25, 2007 (JP) ................................. 2007-332265

(51) Int. Cl.
*G03G 15/00* (2006.01)
*G03G 15/01* (2006.01)
(52) U.S. Cl. .......................................... 399/72; 399/301
(58) Field of Classification Search .................... 399/49, 399/72, 301; 347/116
See application file for complete search history.

(56) References Cited

U.S. PATENT DOCUMENTS

| 6,236,827 | B1 * | 5/2001 | Hada | 399/301 |
|---|---|---|---|---|
| 6,408,156 | B1 * | 6/2002 | Miyazaki et al. | 399/301 |
| 6,714,748 | B1 * | 3/2004 | Nakayasu et al. | 399/72 |
| 7,306,313 | B2 | 12/2007 | Kamimura et al. | |
| 7,800,799 | B2 * | 9/2010 | Kitao | 358/518 |
| 2003/0210412 | A1 | 11/2003 | Ishibashi | |

FOREIGN PATENT DOCUMENTS

| JP | HEI 11-218988 | 8/1999 |
|---|---|---|
| JP | 2000-112205 | 4/2000 |
| JP | 2000-214664 | 8/2000 |
| JP | 2001-5364 | 1/2001 |
| JP | 2003-280317 | 10/2003 |
| JP | 2004-61876 | 2/2004 |
| JP | 2004-117584 | 4/2004 |
| JP | 2005-18094 | 1/2005 |
| JP | 2006-48063 | 2/2006 |

OTHER PUBLICATIONS

Office Action dated Aug. 23, 2011 received from the Japanese Patent Office from related Japanese Application No. 2008-229039, together with an English-language translation.

* cited by examiner

*Primary Examiner* — David Gray
*Assistant Examiner* — Gregory H Curran
(74) *Attorney, Agent, or Firm* — Scully, Scott, Murphy & Presser, PC (57) ABSTRACT

A controlling section controls an image forming section to form a calibration pattern on an object. The calibration pattern includes a plurality of first patterns and a plurality of second patterns. Each of the first patterns includes at least one pair of marks. Each of the at least one pair of marks has different colors and overlaps with each other in a first direction. The first patterns have different degrees of overlapping from each other. Each of the second patterns is formed between one of the first patterns and another one of the first patterns in the moving direction. The detecting section detects the first and second patterns formed on the object. The correcting section corrects the image forming position in the first direction based on detection results of the first patterns, and corrects the image forming position in a second direction based on detection results of the second patterns.

12 Claims, 6 Drawing Sheets

IMAGE FORMING APPARATUS

CROSS REFERENCE TO RELATED APPLICATIONS

This application claims priority from Japanese Patent Application No. 2007-332265 filed Dec. 25, 2007. The entire content of the priority application is incorporated herein by reference.

TECHNICAL FIELD

The invention relates to an image forming apparatus.

BACKGROUND

Conventionally, so-called tandem-type image forming apparatuses are known. This type of image forming apparatus includes a plurality of photosensitive members for each color (yellow, magenta, cyan, and black, for example) that is arranged in a direction in which a paper conveying belt moves. Images in each color borne on a corresponding photosensitive member are sequentially transferred onto a paper on the belt.

In such a tandem-type image forming apparatuses, if image forming positions on paper for each color are deviated (shifted) from the correct positions, color images with color registration errors are formed undesirably. Hence, one of these image forming apparatuses has a function to correct image forming positions of each color (Japanese Patent Application Publication No. 2004-61876). When performing this correcting function, first the image forming apparatus forms a registration pattern (position alignment pattern or calibration pattern) including a plurality of marks on the belt. The registration pattern includes reference color marks and correction color marks, and includes a plurality of pairs of marks having different degrees of overlapping between both marks in a main scanning direction or in a sub-scanning direction. Density of each pair of marks differs depending on the degree of overlapping of the pair of marks. It can be considered that the both marks constituting the pair of marks having density in an extremal value are aligned with each other (the degree of overlapping is maximum). Hence, density of each pair of marks is sequentially measured, and the pair of marks showing an extremal value of those densities is identified. Then, the positional deviation amount that is originally assumed by the image forming apparatus for the pair of marks is determined as the deviation amount of image forming positions of the correction color relative to image forming positions of the reference color in the main scanning direction or in the sub-scanning direction. The timing of forming images is corrected by offsetting the deviation amount.

SUMMARY

Normally, in an image forming apparatus, image forming positions are sometimes deviated not only in one direction (for example, the main scanning direction) but also in another direction (for example, the sub-scanning direction). Thus, deviation amounts in the both directions need to be measured and corrected. In this case, it is preferable that pair of marks for the one direction (for example, the main scanning direction) and pair of marks for the other direction (for example, the sub-scanning direction) be formed on the belt as close timing as possible. This is because the belt does not always circularly move in a stable condition, and moving conditions such as a moving speed and a degree of meandering can change depending on timing. More specifically, if timing of forming the pair of marks for the one direction and timing of forming the pair of marks for the other direction are widely different, the moving conditions of the belt at each formation timing can be very different. Consequently, there is possibility that the accuracy in correcting image forming positions in the both directions (the one direction and the other direction) has variations. Hence, it is preferable that the pairs of marks for the both directions be formed as close timing as possible, and that deviation amounts in the both directions be measured where the moving conditions of the belt are approximately the same.

However, in the above-described image forming apparatus which corrects image forming positions by using the degree of overlapping of the pairs of marks, either only the pairs of marks for the main scanning direction or only the pairs of marks for the sub-scanning direction are formed on the belt continuously. Accordingly, the timing of forming the pairs of marks for the main scanning direction and the timing of forming the pairs of marks for the sub-scanning direction are separated widely. As a result, there is possibility that the accuracy in correcting image forming positions in the both directions (the main scanning direction and the sub-scanning direction) has large variations.

In view of the foregoing, it is an object of the invention to provide an image forming apparatus that is capable of suppressing variations of accuracy in correcting image forming positions in one direction and in another direction, in a configuration where image forming positions are corrected in at least one direction by using a degree of overlapping of a pair of marks.

In order to attain the above and other objects, the invention provides an image forming apparatus. The image forming apparatus includes an image forming section, a controlling section, a detecting section, and a correcting section. The image forming section forms an image on an object. The object is movable in a moving direction. The controlling section controls the image forming section to form a calibration pattern on the object. The calibration pattern includes a plurality of first patterns for correcting an image forming position in a first direction and a plurality of second patterns for correcting an image forming position in a second direction different from the first direction. Each of the plurality of first patterns includes at least one pair of marks Each of the at least one pair of marks has different colors and overlaps with each other in the first direction. The plurality of first patterns has different degrees of overlapping from each other. Each of the plurality of second patterns is formed between one of the plurality of first patterns and another one of the plurality of first patterns in the moving direction. The detecting section detects the plurality of first patterns and the plurality of second patterns formed on the object, thereby obtaining detection results. The correcting section corrects the image forming position in the first direction based on the detection results of the plurality of first patterns, and corrects the image forming position in the second direction based on the detection results of the plurality of second patterns.

BRIEF DESCRIPTION OF THE DRAWINGS

Embodiments in accordance with the invention will be described in detail with reference to the following figures wherein.

DETAILED DESCRIPTION

An image forming apparatus according to an embodiment of the invention will be described while referring to FIGS. 1 through 6. The image forming apparatus of the embodiment is applied to a printer 1.

<Overall Configuration of Printer>

Figure 1:
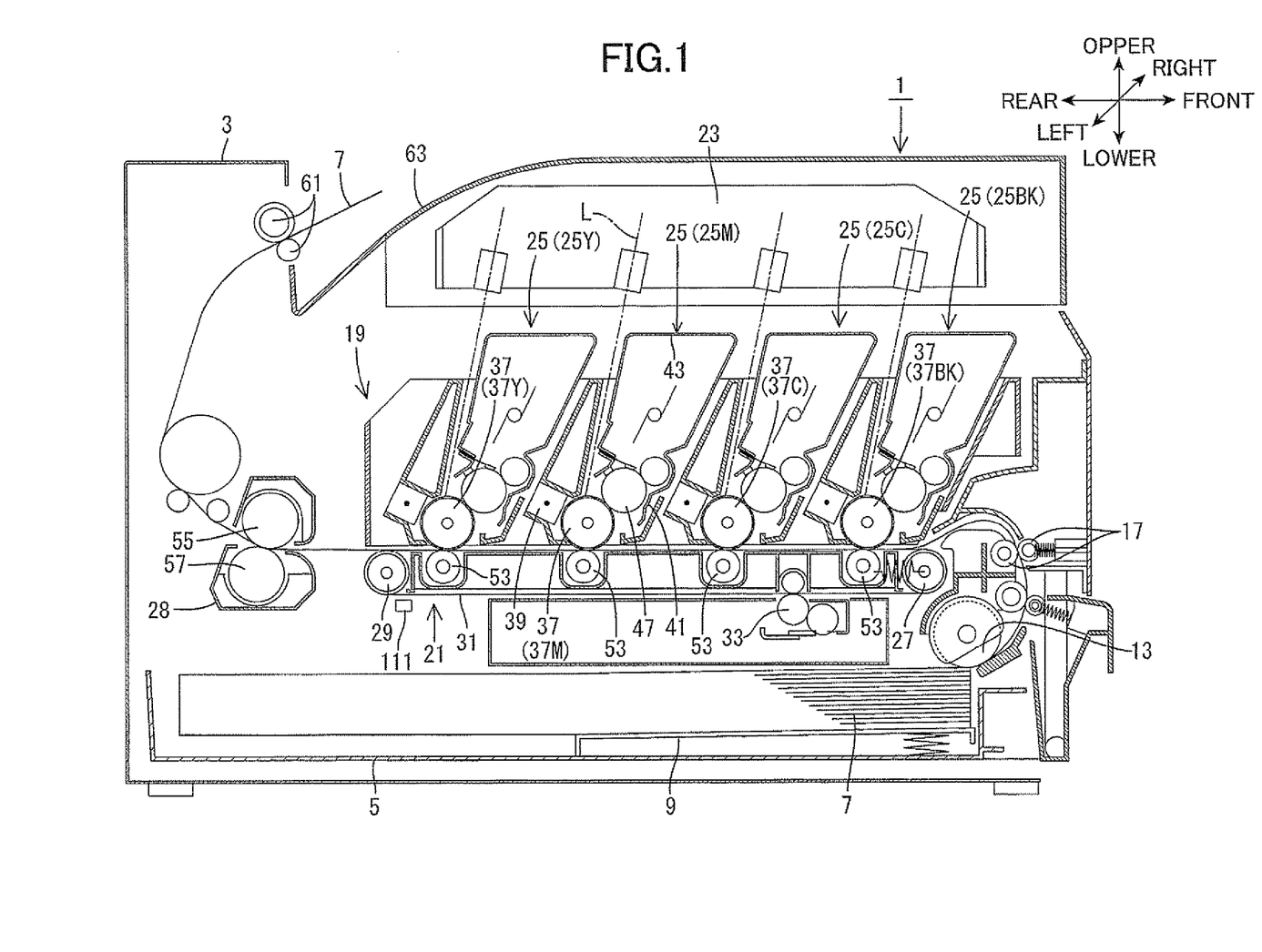
FIG. 1 is a vertical cross-sectional view showing the overall configuration of a printer according to an embodiment of the invention.

FIG. 1 is a vertical cross-sectional view showing the overall configuration of the printer 1. In the following description, the expressions "front", "rear", "upper", "lower", "right", and "left" are used to define the various parts when the printer 1 is disposed in an orientation in which it is intended to be used. As shown in FIG. 1, the right side of FIG. 1 is referred to as the "front" of the printer 1, whereas the left side of FIG. 1 is referred to as the "rear" of the printer 1. Further, the left side when viewed from the front of the printer I is referred to as the "left" side of the printer 1, whereas the right side when viewed from the front of the printer 1 is referred to as the "right" side of the printer 1.

As shown in FIG. 1, the printer 1 (an example of image forming apparatus) is a direct-transfer tandem type color laser printer. The printer 1 has a casing 3 for accommodating and supporting other components therein. A top part of the casing 3 is formed as a discharge tray 63. A sheet supplying tray 5 is provided at the bottom of the casing 3. A plurality of recording mediums 7 (sheet-like mediums such as paper sheets, for example) is stacked in the sheet supplying tray 5.

A pressing plate 9 is provided on the sheet supplying tray 5 for urging the recording mediums 7 toward a pickup roller 13. Rotation of the pickup roller 13 picks up one sheet of the recording mediums 7 to convey the sheet of the recording medium 7 to registration rollers 17. The registration rollers 17 corrects obliqueness of the recording medium 7, and then sends off the recording medium 7 to a belt unit 21 (an example of conveying means) at predetermined timing.

An image forming section 19 includes a scanner section 23 serving as an example of exposing means, a process section 25, a fixing unit 28, and the like. Note that, in the present embodiment, the scanner section 23 and the process section 25 serve as an example of an image forming section.

The belt unit 21 includes a pair of support rollers 27 and 29 (front side support roller 27 and rear side support roller 29) and an endless belt 31 (an example of an object) looped around the pair of support rollers 27 and 29. The rear side support roller 29 is connected to a driving source (not shown) and is rotatably driven to cause the belt 31 to move circularly counterclockwise in FIG. 1, thereby conveying the recording medium 7 placed on the belt 31 to the rear.

A cleaning roller 33 is provided underneath the belt unit 21 for removing toner adhered to the belt 31 (including toner of a calibration pattern 131 described later), paper dusts, and the like.

The scanner section 23 includes four laser emitting sections (not shown) each of which is controlled on and off in accordance with image data in each color. The scanner section 23 irradiates laser light L emitted from each laser emitting section on the surfaces of respective photosensitive drums 37 for each color at high speed scanning.

Four units of the process section 25 are provided for respective colors of black, cyan, magenta, and yellow, for example. Each process section 25 has identical configuration except the color of toner (an example of colorant) or the like. In the following descriptions, reference signs are added with suffixes of BK (black), C (cyan), M (magenta), and Y (yellow) when the colors need to be distinguished. Otherwise, the suffixes are omitted.

Each process section 25 includes the photosensitive drum 37 (an example of image bearing member and photosensitive member), a charger 39, a developing cartridge 41, and the like. The developing cartridge 41 has a toner accommodating chamber 43, a developing roller 47, and the like. Four transfer rollers 53 (an example of a transfer section) are provided below respective ones of the photosensitive drums 37 with the belt 31 therebetween. Toner accommodated in the toner accommodating chamber 43 is supplied to the developing roller 47.

The surface of the photosensitive drum 37 is uniformly charged to positive polarity by the charger 39. Thereafter, the surface of the photosensitive drum 37 is exposed to laser light L emitted from the scanner section 23. This way, the surface of the photosensitive drum 37 is formed with an electrostatic latent image corresponding to an image in each color to be formed on the recording medium 7.

Then, toner borne on the developing roller 47 is supplied to the electrostatic latent image formed on the surface of the photosensitive drum 37, allowing the electrostatic latent image to become a visible toner image in each color.

Thereafter, when the recording medium 7, which is conveyed by the belt 31, passes each transfer position between the photosensitive drum 37 and the transfer roller 53, the toner image on the surface of each photosensitive drum 37 is sequentially transferred onto the recording medium 7 due to a negative-polarity transfer bias applied to the transfer roller 53. In this way, the recording medium 7 on which the toner image has been transferred is conveyed to the fixing unit 28.

The fixing unit 28 includes a heat roller 55 and a pressure roller 57. The heat roller 55, in cooperation with the pressure roller 57, conveys and heats the recording medium 7 bearing the toner image, thereby thermally fixing the toner image on the recording medium 7. Then, discharge rollers 61 discharge the recording medium 7 with the thermally-fixed toner image onto the discharge tray 63.

<Electrical Configuration of Printer>

Figure 2:
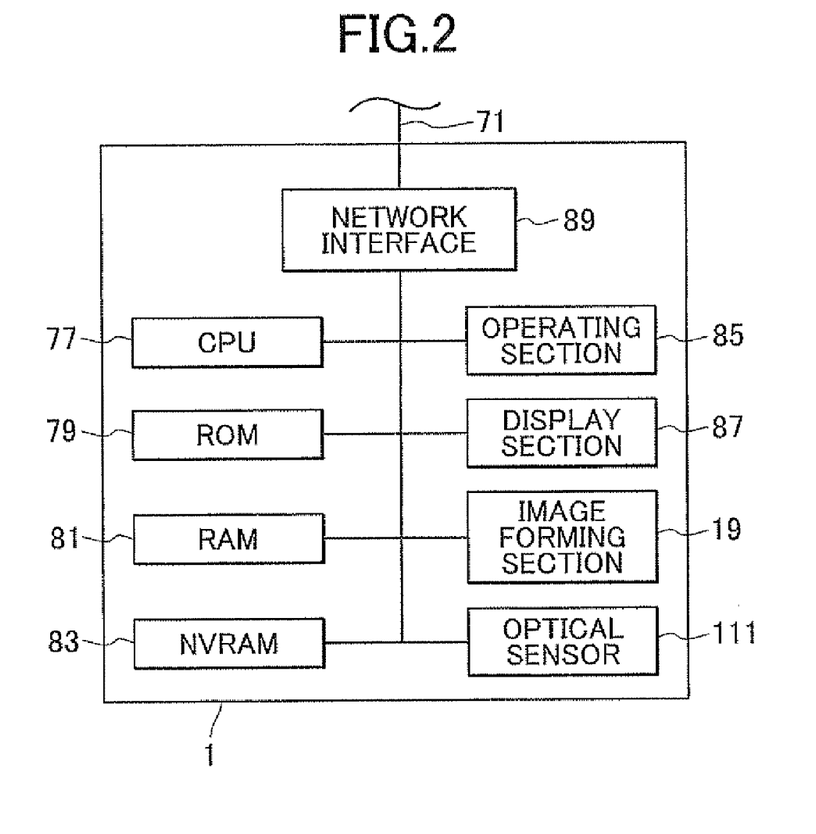
FIG. 2 is a block diagram showing the electrical configuration of the printer of FIG. 1.

FIG. 2 is a block diagram showing the electrical configuration of the printer 1. The printer 1 has a CPU 77, a ROM 79, a RAM 81, an NVRAM 83 (an example of a memory), an operating section 85, a display section 87, the image forming section 19 described above, a network interface 89, an optical sensor 111, and the like.

The ROM 79 stores various programs for controlling operations of the printer 1. The CPU 77 reads out the programs from the ROM 79, executes processing in accordance with the programs, and stores the processing results in the RAM 81 or the NVRAM 83, thereby controls the operations of the printer 1.

The operating section 85 includes a plurality of buttons. The operating section 85 is capable of inputting various operations performed by a user, such as an instruction of print start. The display section 87 includes a liquid crystal display (LCD) and a lamp. The display section 87 is capable of displaying various setting screens, operating conditions, and the like. The network interface 89 is connected to an external computer (not shown) or the like via a communication line 71, and enables data communications between the printer 1 and the external computer or the like.

<Configuration for Registration Error Correcting Process>

In the printer 1 capable of forming a color image, if image forming positions (transfer positions) of each color on the recording medium 7 are shifted (deviated) from the correct positions, a color image with color registration errors is formed. Hence, it is important to align image forming positions of each color. A registration error correcting process is a process for correcting the above-described color registration errors.

In the registration error correcting process, the CPU 77 of the printer 1 reads data of the calibration pattern 131 (registration pattern) out of the NVRAM 83, for example, and provides the data to the image forming section 19 as image data. At this time, the CPU 77 functions as a controlling section. The image forming section 19 forms the calibration pattern 131 on a surface of the belt 31. The CPU 77 then controls the optical sensor 111 to detect a deviation amount of the calibration pattern 131 based on a level of received light, and corrects laser scanning positions by offsetting the deviation amount. Here, the laser scanning positions are positions on each photosensitive drum 37 at which the scanner section 23 irradiates laser light for each color. The laser scanning positions can be changed by changing timing at which the laser light is emitted in the scanner section 23, for example.

1. Optical Sensor

Figure 3:
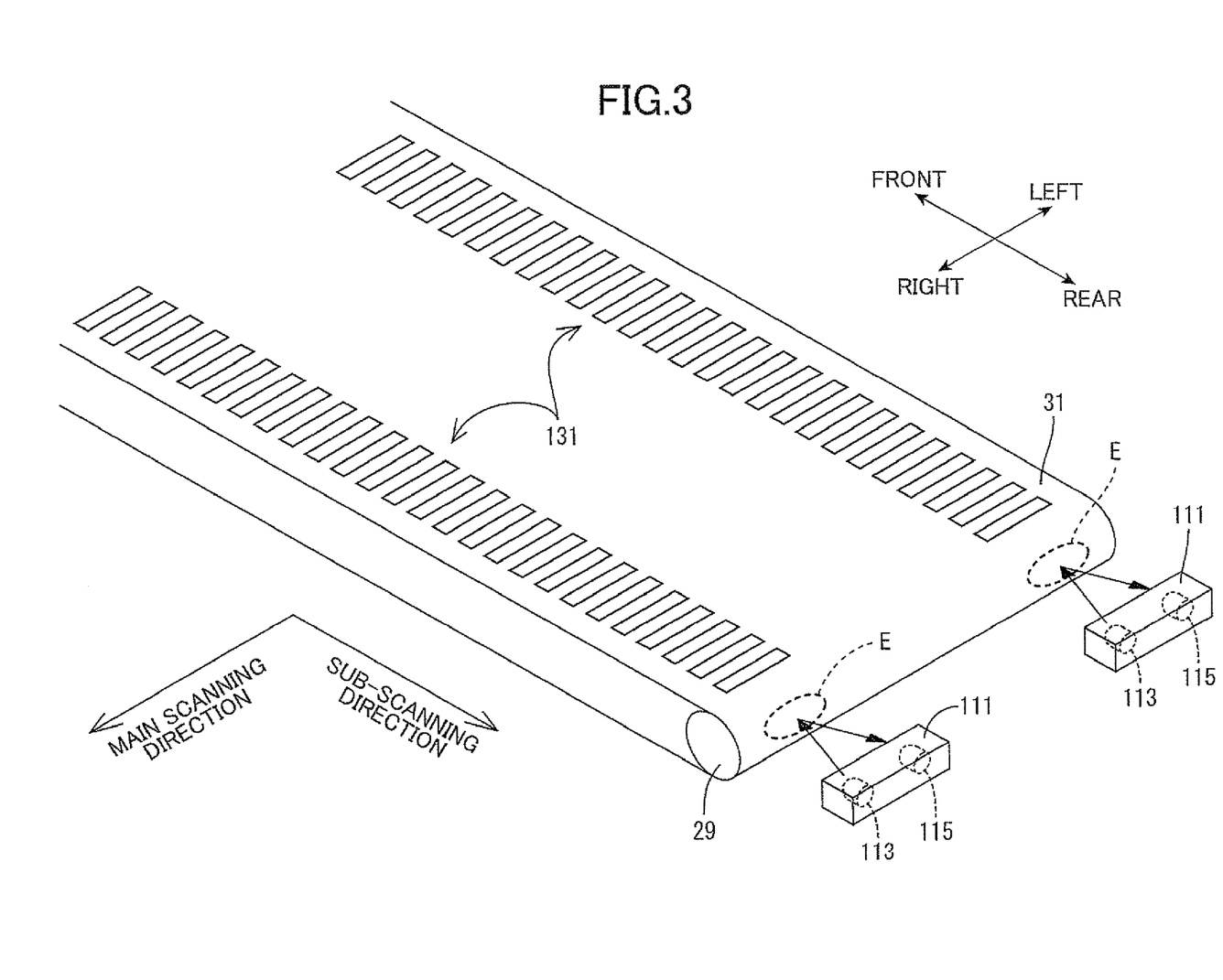
FIG. 3 is a perspective view of optical sensors and a belt provided in the printer of FIG. 1.

As shown in FIG. 3, one or a plurality of optical sensors 111 (two in the present embodiment) is provided at the rear lower side of the belt 31 (see FIG. 1). In the present embodiment, the two optical sensors 111 are arranged in the left-right direction. Each optical sensor 111 is a reflection type sensor having a light emitting element 113 (an LED, for example) and a light receiving element 115 (a photo transistor, for example). More specifically, the light emitting element 113 irradiates light on the surface of the belt 31 from a direction slanted to the surface, and the light receiving element 115 receives light reflected on the surface of the belt 31. The light emitted from the light emitting element 113 forms a spot region on the surface of the belt 31. The spot region is a detection region E of the optical sensor.

Figure 4:
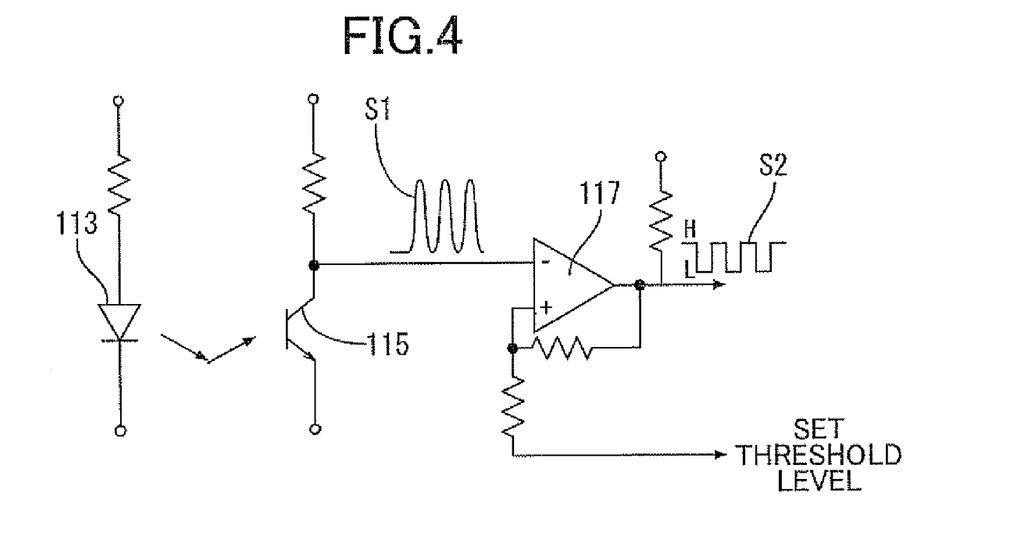
FIG. 4 is a circuit diagram of each of the optical sensors shown in FIG. 3.

FIG. 4 is a circuit diagram of each of the optical sensors 111. A received light signal S1 becomes lower as a level of light amount received by the light receiving element 115 is higher. The other way around, the received light signal S1 becomes higher as the level of light amount received by the light receiving element 115 is lower. The received light signal S1 is inputted into a hysteresis comparator 117 (an example of comparison circuit). The hysteresis comparator 117 compares the level of the received light signal S1 with detection threshold values TH1 and TH2, and outputs a binary signal S2 that is inverted in accordance with the comparison results.

2. Calibration Pattern of the Present Embodiment

Figure 5:
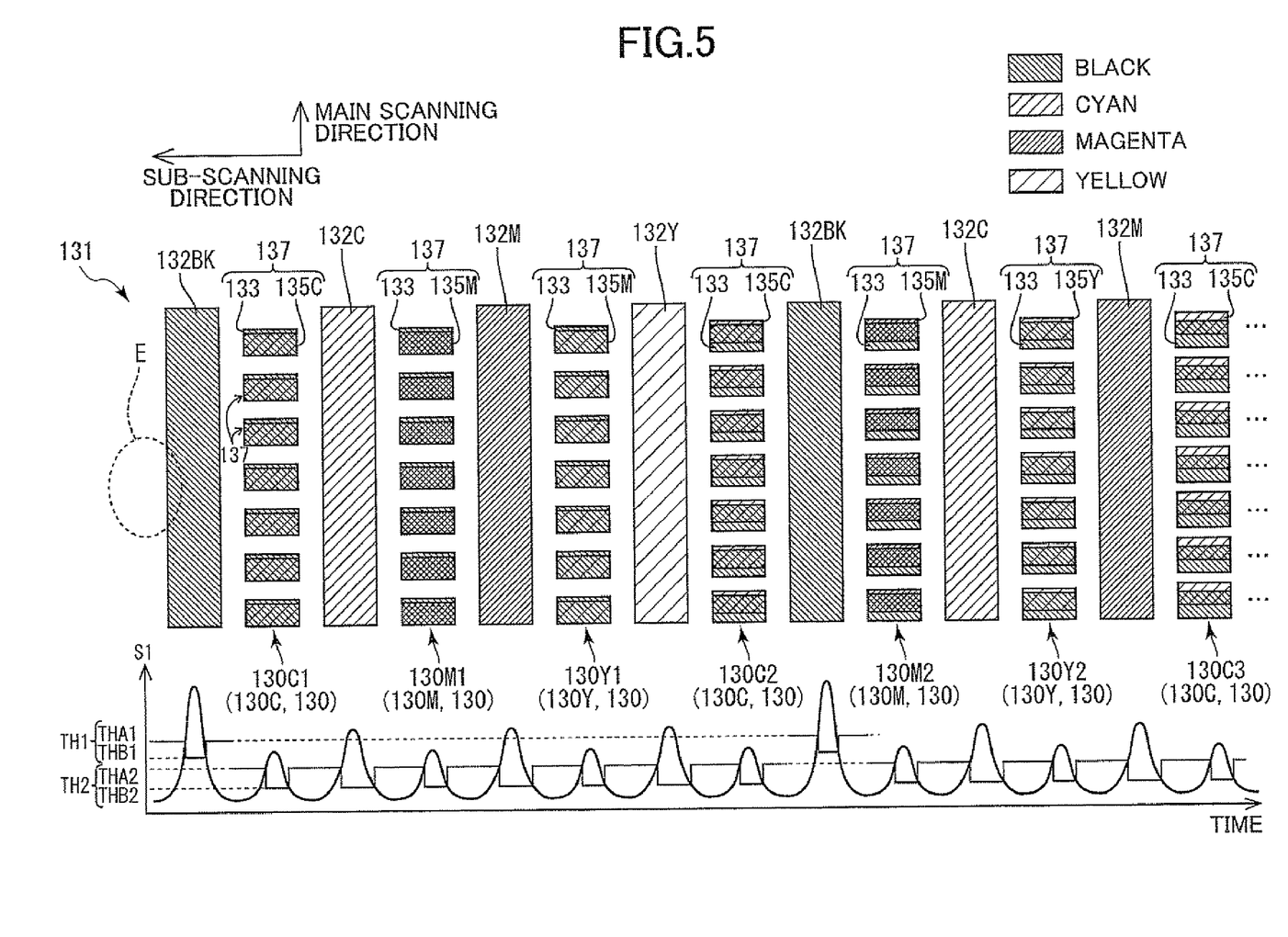
FIG. 5 is an explanatory diagram showing a calibration pattern according to the embodiment and showing a waveform chart of received light signal.

FIG. 5 is an explanatory diagram showing a calibration pattern 131 according to the embodiment and showing a waveform chart of received light signal SI received from the calibration pattern 131 by the optical sensor 111. The calibration pattern 131 includes a plurality of first patterns 130 and a plurality of second patterns 132. Note that the calibration pattern 131 has the same patterns arranged along each of the left and right ends of the belt 31 (see FIG. 3), and that FIG. 5 shows a part of the patterns formed on one side of the belt 31.

<First Pattern>

The first patterns 130 are patterns for detecting deviations of image forming positions in the main scanning direction (the direction perpendicular to the conveying direction of the recording medium 7 conveyed by the belt 31, an example of a first direction). As shown in FIG. 5, the plurality of first patterns 130 is arranged in the sub-scanning direction with intervals (spaces) therebetween. Each of the first patterns 130 includes pairs of marks 137 (an example of pairs of marks having different colors), each pair having a reference color mark 133 (black, for example) and an adjustment color mark 135 (one color other than black, for example). Each of the first patterns 130 has a degree of overlapping between the marks 133 and 135 in the main scanning direction. The first patterns 130 have different degrees of overlapping from each other.

More specifically, the first patterns 130 include a plurality of cyan first patterns 130C for correcting image forming positions of cyan images, a plurality of magenta first patterns 130M for correcting image forming positions of magenta images, and a plurality of yellow first patterns 130Y for correcting image forming positions of yellow images. Each of the cyan first patterns 130C includes pairs of marks 137 of a black mark 133 and a cyan mark 135C. Each of the magenta first patterns 130M includes pairs of marks 137 of a black mark 133 and a magenta mark 135M. Similarly, each of the yellow first patterns 130Y includes pairs of marks 137 of a black mark 133 and a yellow mark 135Y.

Among the plurality of cyan first patterns 130C, degrees of overlapping of the cyan mark 135C relative to the black mark 133 (mark overlapping degree) change gradually in the sub-scanning direction. More specifically, a cyan first pattern 130C1 having a largest mark overlapping degree is arranged at the beginning (the left side in FIG. 5). Then, the cyan first patterns 130C having mark overlapping degrees decreased by a predetermined amount are arranged in the sub-scanning direction (cyan first patterns 130C2 and 130C3 are shown in FIG. 5). When the mark overlapping degree becomes the minimum, the mark overlapping degrees of the cyan first patterns 130C now increase by the predetermined amount in the sub-scanning direction. Similarly, when the mark overlapping degree becomes the maximum, the mark overlapping degrees of the cyan first patterns 130C again decrease by the predetermined amount in the sub-scanning direction. In this way, the cyan first patterns 130C are arranged repeatedly in the sub-scanning direction. Note that it is not necessary that the mark overlapping degree change gradually in the sub-scanning direction, and the mark overlapping degree may be changed irregularly. However, the phase (peak timing) of a sample waveform W1 described later can be determined more accurately with the configuration in which the mark overlapping degree changes gradually in the sub-scanning direction.

In the present embodiment, the differences in the mark overlapping degrees between the two cyan first patterns 130C located closest to each other are a constant value (one dot, for example) In the example of FIG. 5, the difference in the mark overlapping degrees between the cyan first patterns 130C1 and 130C2 is equal to the difference in the mark overlapping degrees between the cyan first patterns 130C2 and 130C3. However, the differences in the mark overlapping degrees may be non-constant. Further, in the present embodiment, the width of the black mark 133 and the width of the cyan mark 135C in the main scanning direction are different by one dot width, for example. The same goes for the plurality of magenta first patterns 130M and the plurality of yellow first patterns 130Y, and descriptions are omitted.

Next, the arrangement relationship of the first patterns 130 for each adjustment color will be described. In an image forming apparatus that uses a plurality of adjustment colors, it is possible that all the first patterns 130 having adjustment color marks 135 for one adjustment color are formed on the belt 31, and thereafter, all the first patterns 130 having adjustment color marks 135 for another adjustment color are formed on the belt 31. In this case, however, the formation positions on the belt 31 and the formation timing differ considerably depending on each adjustment color. Hence, unless the first patterns 130 for each adjustment color are formed on the entire circumference of the belt 31, there is possibility that the accuracy in correcting image forming positions for each adjustment color has variations due to the difference of the rotation condition of the belt 31. On the other hand, if the first patterns 130 for each adjustment color are formed on the entire circumference of the belt 31, the overall length of the calibration pattern 131 becomes long and the processing time for correcting image forming positions increases.

Accordingly, in the present embodiment, the first patterns 130 in a plurality of adjustment colors (three colors) are sequentially formed by a predetermined unit number. More specifically, one first pattern 130 is formed for each of cyan (130C1), magenta (130M1), and yellow (130Y1), and then one first pattern 130 having the mark overlapping degree changed by one dot width is formed for each of cyan (130C2), magenta (130M2), and yellow (130Y2). With this configuration, because the first pattern 130 of each adjustment color can be arranged dispersedly within a predetermined range (for example, the entire circumference) of the belt 31, the positions of forming the first patterns 130 are not concentrated at a certain location. Thus, it is possible to suppress variations of the accuracy in correcting image forming positions for each adjustment color due to the rotation irregularities of the belt 31.

<Second Pattern>

The second patterns 132 are patterns for detecting deviations of image forming positions in the sub-scanning direction (the conveying direction, an example of a second direction). The second patterns 132 have a configuration where single-color patterns 132BK, 132C, 132M, and 132Y in black, cyan, magenta, and yellow, respectively, are arranged on the belt 31 at predetermined intervals in the sub-scanning direction. More specifically, the second patterns 132 have a configuration where a plurality of groups each including one black mark 132BK, one cyan mark 132C, one magenta mark 132M, and one yellow mark 132Y in this order is arranged repeatedly.

<Relationship Between First Pattern and Second Pattern>

In the calibration pattern 131, each second pattern 132 is arranged between one first pattern 130 and another first pattern 130 in the sub-scanning direction. More specifically, the first patterns 130 are separated by a predetermined number (one in the present embodiment) of the second patterns 132 to an equal number (one in the present embodiment) in the sub-scanning direction. Also, the same number of the first patterns 130 and the second patterns 132 (one first pattern 130 and one second pattern 132 in the present embodiment) are arranged alternately in the sub-scanning direction.

Further, the overall length of the calibration pattern 131 in the sub-scanning direction is greater than or equal to the entire circumferential length of the belt 31. More specifically, as to the first patterns 130, a group of marks with the smallest mark overlapping degree through a group of marks with the largest mark overlapping degree are formed repeatedly one at a time with predetermined intervals over a length greater than or equal to the entire circumferential length of the belt 31. As to the second patterns 132, groups each including single-color marks of one black mark 132BK, one cyan mark 132C, one magenta mark 132M, and one yellow mark 132Y are formed repeatedly over a length greater than or equal to the entire circumferential length of the belt 31. Additionally, both the first patterns 130 and the second patterns 132 have band-like or belt-like outer shapes extending in the main scanning direction, and have the same width in the sub-scanning direction. Accordingly, a large number of the first patterns 130 and the second patterns 132 can be formed within a predetermined length of the belt 31, thereby improving the accuracy in correcting image forming positions.

<Contents of Registration Error Correcting Process>

The CPU 77 executes a registration error correcting process when a color registration error correcting timing comes. The color registration error correcting timing is, for example, an elapsed time since the previous registration error correcting process reaches a predetermined value, the number of recording mediums on which images are formed reaches a predetermined number, or the like.

The CPU 77 forms the calibration pattern 131 on the belt 31 and acquires an array of the binary signals S2 from the optical sensor 111. The CPU 77 executes the following process separately on pulse waveforms for the first patterns 130 and on pulse waveforms for the second patterns 132. Note that whether each pulse waveform corresponds to the first patterns 130 or the second patterns 132, and which color each pulse waveform corresponds to can be known by associating an order of each pulse waveform from the beginning with an arrangement order of the first patterns 130 and the second patterns 132 in the calibration pattern 131, for example.

1. Process of Pulse Waveform Corresponding to First Pattern

In the following descriptions, because similar processes are performed on all of the adjustment colors of cyan, magenta, and yellow, a process of the first patterns 130 for correcting one adjustment color is described as an example.

Regarding an amount of reflected light, a belt surface (exposed part of the belt 31) reflects a greater amount of light for the same amount of incident light than the marks. Further, an adjustment color mark (cyan, magenta, and yellow in the present embodiment) reflects a greater amount of light than a black color mark. As described above, the amount of reflected light and the level of the received light signal S1 have the opposite relationship. That is, the greater the amount of reflected light is, the lower the level of the received light signal S1 is. The smaller the amount of reflected light is, the higher the level of the received light signal S1 is.

Figure 6:
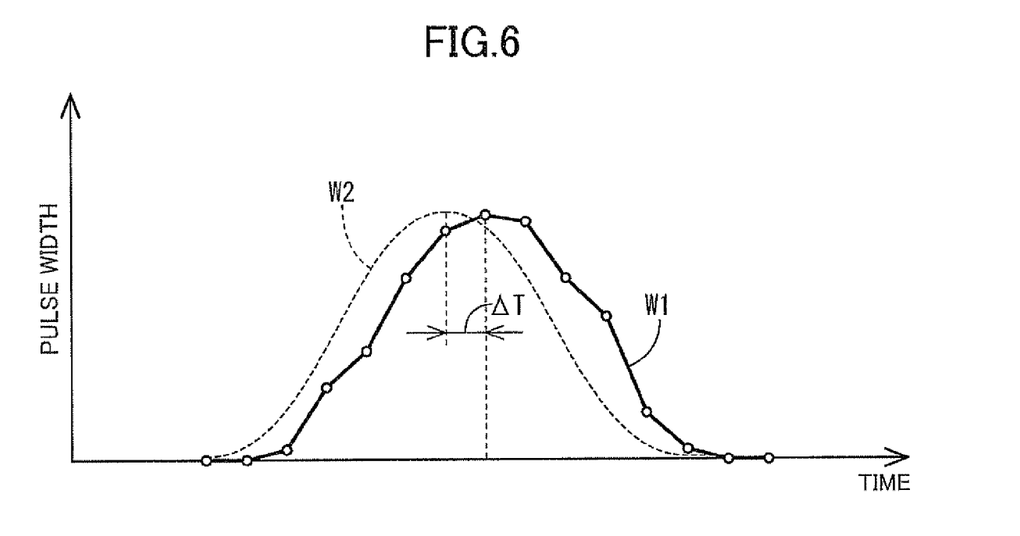
FIG. 6 is a graph showing pulse widths (the vertical axis) with respect to time (the horizontal axis) for both a sample waveform and a reference waveform.

With the above into consideration, as the mark overlapping degree is larger, an exposed area of the surface of the belt 31 is larger. Thus, the amount of reflected light form the detection region E differs depending on the mark overlapping degree between the reference color mark 133 and the adjustment color mark 135. Hence, as the mark overlapping degree becomes larger, the exposed area of the surface of the belt 31 increases, and the level of the received light signal S1 becomes lower. As the level of the received light signal S1 becomes lower, the pulse width of the binary signal S2 becomes narrower. Here, the pulse width is a time difference between timing at which the received light signal S1 exceeds an upper limit value THA of the detection threshold value TH1 (TH2) and timing at which the received light signal S1 falls below a lower limit value THB of the detection threshold value TH1 (TH2). In contrast, as the mark overlapping degree becomes smaller, the exposed area of the surface of the belt 31 decreases, the level of the received light signal S1 becomes higher, and the pulse width of the binary signal S2 becomes wider. Note that, in the waveform chart of FIG. 5, the differences in the level of the received light signal S1 and the difference in the pulse width of the binary signal S2 are not clearly shown. The CPU 77 obtains the pulse width of each pulse waveform based on the binary signal S2, the pulse width changing depending on the mark overlapping degree of the first patterns 130. As shown in FIG. 6, the CPU 77 then obtains a sample waveform W1 based on the pulse width of each pulse waveform. At this time, the CPU 77 and the optical sensors 111 function as a detecting section.

Thereafter, the CPU 77 determines the deviation amount of each adjustment color in the main scanning direction (deviation amounts of image forming positions relative to black) based on the sample waveform W1. More specifically, the CPU 77 obtains the phase difference between the sample waveform W1 and a reference waveform W2 (for example, a time difference ΔT between the peak timing of the sample waveform W1 and the peak timing of the reference waveform W2). Here, the reference waveform W2 is defined as the sample waveform that is obtained under the condition where the image forming positions between the reference color and an adjustment color in the main scanning direction are aligned. The NVRAM 83 stores correlation data between phase differences and deviation amounts of image forming positions.

If image forming positions of the reference color and the adjustment color are aligned, the image forming section 19 forms the calibration pattern 131 as exactly shown in FIG. 5 on the belt 31. Because the phase difference is substantially zero at this time, the CPU 77 reads, out of the NVRAM 83, the deviation amount data of zero which corresponds to the zero phase difference.

On the other hand, if the image forming position of the adjustment color is deviated from the image forming position of the reference color in the main scanning direction, the sample waveform W1 has a phase difference relative to the reference waveform W2 as shown in FIG. 6. Hence, the CPU 77 reads the deviation amount data corresponding to this phase difference out of the NVRAM 83. Then, based on the deviation amount data, the CPU 77 determines the deviation amount of the image forming position of the one adjustment color relative to the reference color in the main scanning direction. The CPU 77 performs the subsequent image forming operations by offsetting (compensating) the deviation amount to correct image forming positions. At this time, the CPU 77 functions as a correcting section. Note that, in the present embodiment, the CPU 77 obtains a deviation amount for each group of the first patterns 130, and determines the average value of deviation amounts of all the groups as the above-described deviation amount of image forming positions in the main scanning direction. Here, one group of the first patterns 130 includes the first pattern 130 generating the smallest pulse width (the leftmost plot of the sample waveform W1 in FIG. 6) through the next first pattern 130 generating the smallest pulse width (the rightmost plot of the sample waveform W1 in FIG. 6). In other words, one group of the first patterns 130 corresponds to all the plots of the sample waveform W1 shown in FIG. 6.

2. Process of Pulse Waveform Corresponding to Second Pattern

The CPU 77 obtains relative distances on the belt 31 for each adjustment color mark 132C, 132M, and 132Y relative to the reference color mark 132BK, based on the pulse waveforms corresponding to the second patterns 132. More specifically, the CPU 77 obtains mean timing (average timing) between a rising edge timing and a trailing edge timing of each pulse waveform corresponding to each single-color mark 132BK, 132C, 132M, and 132Y, as detection timing of each single-color mark 132BK, 132C, 132M, and 132Y.

Then, the CPU 77 calculates the relative distances based on differences in the detection timing between each adjustment color mark 132C, 132M, and 132Y and the reference color mark 132BK. At this time, the CPU 77 and the optical sensors 111 function as a detecting section.

A reference distance is defined as a relative distance of one adjustment color relative to the reference color when an image forming position of the reference color matches an image forming position of the one adjustment color in the sub-scanning direction. If the relative distance is different from the reference distance, the CPU 77 determines the difference as a deviation amount of the image forming position in the sub-scanning direction of the one adjustment color relative to the reference color, and stores the deviation amount in the NVRAM 83 as deviation amount data. When the CPU 77 performs subsequent image forming operations, the CPU 77 corrects image forming positions in the sub-scanning direction by offsetting the deviation amount based on the deviation amount data. At this time, the CPU 77 functions as a correcting section. In the present embodiment, the CPU 77 obtains the deviation amounts for all the groups of the second patterns 132, and determines the average value of the deviation amounts for all the groups as the deviation amount of the image forming position in the sub-scanning direction.

3. Detection Threshold Value

The first patterns 130 include gaps (spaces) depending on the mark overlapping degree, and most of the first patterns 130 include exposed parts of the belt surface. Hence, changes in the level of received light of the first patterns 130 are smaller than changes in the level of received light of single color patterns of the second patterns 132 (see FIG. 5). Especially, the black mark 132BK, which is the only achromatic color among the single color marks 132BK, 132C, 132M, and 132Y, produces large changes in the level of received light at the light receiving element 115.

Thus, the first detection threshold value TH1 (upper limit value THA1 and lower limit value THB1) is used for detecting the black mark 132BK, whereas the second detection threshold value TH2 (upper limit value THA2 and lower limit value THB2) smaller than the detection threshold value TH1 is used for detecting the first patterns 130. For example, this can be achieved by a method of using two hysteresis comparators 117 having different threshold levels, or a method of changing setting of the threshold level of a common hysteresis comparator 117. With this configuration, the effects of noise can be suppressed when the pulse widths of pulse waveforms of the patterns 130 and 132 are detected. Note that, in the present embodiment, the detection threshold value TH2 is used for detecting the single color patterns 132C, 132M, and 132Y in the adjustment colors. However, the detection threshold value TH1 may be used depending on the detection condition.

<Effects of the Present Embodiment>

(1) The printer 1 of the present embodiment corrects the image forming positions in the main scanning direction, based on the plurality of first patterns 130 having different mark overlapping degrees of the pairs of marks 137 (i.e., different densities). On the other hand, the printer 1 corrects the image forming positions in the sub-scanning direction based on the second patterns 132 including the single color marks 132BK, 132C, 132M, and 132Y. Further, it is not that the printer 1 forms only the plurality of first patterns 130 continuously on the belt 31, but the printer 1 forms each second pattern 132 between one first pattern 130 and another first pattern 130 in the sub-scanning direction. Thus, because the first patterns 130 and the second patterns 132 are formed as close timing as possible, the deviation amounts in the both directions can be measured under the conditions where the rotation conditions of the belt 31 are approximately the same. Accordingly, in the configuration where the image forming position in at least one direction is corrected using the overlapping degree of a pair of marks, variations of accuracy in correcting the image forming positions in the main scanning direction and in the sub-scanning direction can be suppressed, compared with the conventional configuration where only pairs of marks for either the main scanning direction or the sub-scanning direction are formed continuously.

(2) If the first patterns 130 are formed at irregular intervals in the sub-scanning direction, there is possibility that the effects due to the rotation irregularities of the belt 31 can not be suppressed uniformly. Hence, in the present embodiment, the first patterns 130 are formed on the belt 31 at substantially regular (equal) intervals in the sub-scanning direction. More specifically, the first patterns 130 are separated by a predetermined number (one in the present embodiment) of the second patterns 132 into an equal number (one in the present embodiment) in the sub-scanning direction. Also, the same number of the first patterns 130 and the second patterns 132 (one first pattern 130 and one second pattern 132 in the present embodiment) are arranged alternately in the sub-scanning direction. Accordingly, both of the first patterns 130 and the second patterns 132 are formed on the belt 31 in a balanced manner, and the variations of accuracy in correcting the image forming positions in the main scanning direction and in the sub-scanning direction can be suppressed more reliably.

(3) Further, the first patterns 130 and the second patterns 132 are formed on the belt 31 in a length that is greater than or equal to the entire circumferential length of the belt 31. Hence, the effects due to cyclic fluctuations (rotation irregularities) can be suppressed in correcting the image forming positions.

(4) In the present embodiment, the first patterns 130 having different mark overlapping degrees (densities) are used for correcting the image forming positions in the main scanning direction, while the second patterns 132 consisting of single color marks are used for correcting the image forming positions in the sub-scanning direction. Hence, the overall length of the first patterns 130 and the second patterns 132 in the sub-scanning direction can be shortened, compared with a configuration in which first patterns 140 (see FIG. 7) are used for correcting the image forming positions in the sub-scanning direction.

Figure 7:
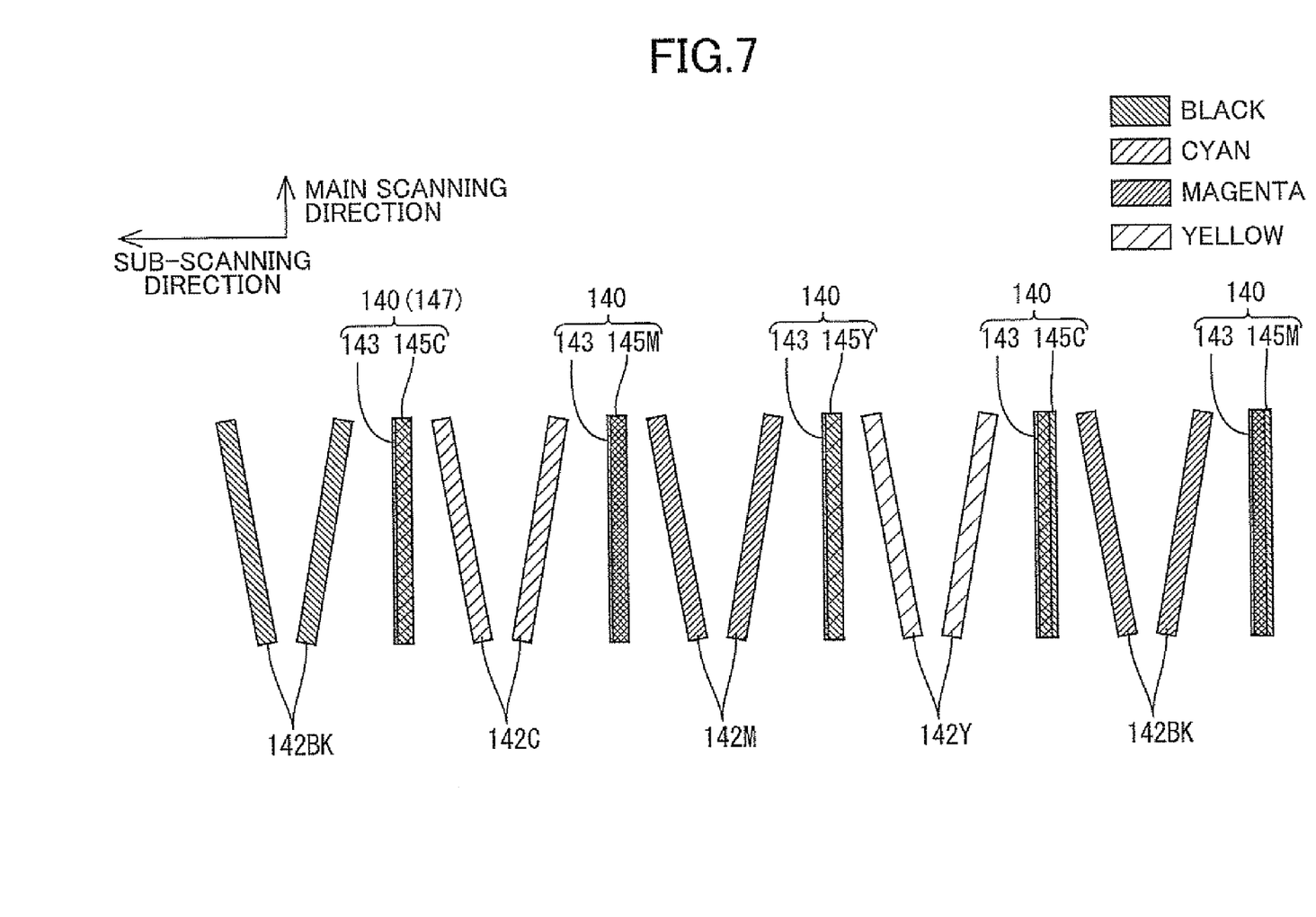
FIG. 7 is an explanatory diagram showing a calibration pattern according to a modification.

(5) Assuming that a calibration pattern includes the second patterns 132 of FIG. 5 and second patterns 142 of FIG. 7 that are arranged alternately, this configuration can also correct deviations of image forming positions in the main scanning direction and in the sub-scanning direction. However, both of the second patterns 132 and the second patterns 142 consist of single color marks. Especially, single color marks in chromatic colors (Y, M, C) have large light scattering characteristics. Hence, unless the distances between the adjacent marks are large enough, the waveforms of light received by the optical sensor 111 interfere with each other and the detection accuracy may be degraded. In contrast, because the first patterns 130 having different mark overlapping degrees have gaps (spaces) depending on the mark overlapping degree, the waveforms of received light of the first patterns 130 are smaller than those of the single color marks. Thus, according to the present embodiment, the distances between the first patterns and the second patterns can be shortened, compared with the above-described configuration where the calibration pattern including the second patterns 132 and 142 is used. That is, because a large number of patterns can be formed within a predetermined length of the belt 31, the correction accuracy of the image forming positions can be improved. Further, in the present embodiment, black is used as the reference color, and each of the first patterns 130 includes a combination of the black mark 133 and one of the adjustment color mark 135. Because such a combination has smaller light scattering characteristics than a combination of a chromatic color and another chromatic color, the distances between the first patterns and the second patterns can be shorted.

(6) Because the first patterns 130 and the second patterns 132 are detected by the common optical sensors 111 in the present embodiment, the configuration can be simplified compared with a configuration where the first patterns 130 and the second patterns 132 are detected by different sensors. In the present embodiment, the first patterns 130 and the second patterns 132 have the same width in the moving direction of the belt 31. Thus, the difference and densities of colors of the both patterns can be reflected greatly on the optical characteristics of the optical sensor 111, compared with a configuration where the first patterns 130 and the second patterns 132 have different widths in the moving direction of the belt 31. Hence, the detection process can be more simplified in that the marks can be detected with a common detection threshold value, for example.

<Modifications>

While the invention has been described in detail with reference to the above aspects thereof, it would be apparent to those skilled in the art that various changes and modifications may be made therein without departing from the scope of the claims.

(1) For example, in the above-described embodiment, the calibration pattern 131 is formed on the belt 31. However, the calibration pattern may be formed on the recording medium 7 (a sheet-like medium such as paper and OHP sheet) which is conveyed by the belt 31. Further, if an image forming apparatus is of an intermediate transfer type having an intermediate transfer belt that directly bears a developer image formed on an image bearing member, the calibration pattern may be formed on the intermediate transfer belt.

(2) In the above-described embodiment, the second patterns are single color marks. However, the second patterns may be a plurality of pairs of marks having different mark overlapping degrees, as well as the first patterns. For example, instead of the second patterns 132, the first patterns 140 of FIG. 7 can be applied to the calibration pattern 131 of FIG. 5 in the above-described embodiment.

(3) In the above-described embodiment, both of the first patterns 130 and the second patterns 132 have band-like outer shapes (rectangular shapes) that extend in the main scanning direction. However, the outer shapes are not limited to the rectangular shapes and may be ellipse shapes or the like that preferably extend in the same direction. Further, both of the first patterns 130 and the second patterns 132 may extend in a direction different from the main scanning direction. In the configuration of the above-described embodiment, however, the first patterns 130 and the second patterns 132 can be arranged on the belt 31 most efficiently.

(4) In the above-described embodiment, the color laser printer 1 of a direct transfer type is described as an example of the image forming apparatus. However, the image forming apparatus of the invention may be applied to a laser printer of an intermediate transfer type, an LED printer, or the like. Further, the image forming apparatus of the invention may be applied to an inkjet type printer. Also, the image forming apparatus may be a printer using colorants (toner, ink, etc.) of two colors, three colors, or five colors or more.

(5) In the calibration pattern 131 of the above-described embodiment, the same number of the first patterns 130 and the second patterns 132 are arranged alternately in the sub-scanning direction. However, different numbers of the first patterns 130 and the second patterns 132 may be arranged alternately in the sub-scanning direction. However, because the first patterns 130 and the second patterns 132 can be arranged on the belt 31 at equal intervals in the above-described embodiment, the configuration can suppress the variations of accuracy in correcting the image forming positions both in the main scanning direction and in the sub-scanning direction.

(6) A modification shown in FIG. 7 will be described. In this modification, a plurality of first patterns 140 having different mark overlapping degrees (densities) is used for correcting the image forming positions in the sub-scanning direction, in contrast to the above-described embodiment. On the other hand, second patterns 142 including single color marks 142BK, 142C, 142M, and 142Y are used for correcting the image forming positions in the main scanning direction. More specifically, as shown in FIG. 7, the plurality of first patterns 140 includes a plurality of pairs of marks 147 having different mark overlapping degrees of each adjustment color mark 145C, 145M, and 145Y relative to a reference color mark 143 in the sub-scanning direction. The area of the pair of marks 147 changes in response to the mark overlapping degree in the sub-scanning direction. The amount of reflected light and the pulse width also change in response to the change of the area. Hence, a waveform similar to the sample waveform W1 of FIG. 6 can be obtained. Then, this waveform is compared with a reference waveform similar to the reference waveform W2 to obtain a time difference ΔT. The deviation amount in the sub-scanning direction can be obtained from the time difference ΔT. Each of the second patterns 142 is a pair of marks in a single color that are slanted in different directions (in different angles) with respect to the sub-scanning direction. With this arrangement, if the image forming position of one color is deviated, then the mark distance between the pair of marks obtained based on the binary signal S2 from the optical sensor 111 also changes. Hence, the deviation amount of the image forming position in each color can be measured based on the amount of change in the mark distance.

What is claimed is:

1. An image forming apparatus comprising:
    an image forming section that forms an image on an object, the object being movable in a moving direction;
    a controlling section that controls the image forming section to form a calibration pattern on the object, the calibration pattern including a plurality of first patterns for correcting an image forming position in a first direction and a plurality of second patterns for correcting an image forming position in a second direction different from the first direction, each of the plurality of first patterns including at least one pair of marks, each of the at least one pair of marks having different colors and overlapping with each other in the first direction, the plurality of first patterns having different degrees of overlapping from each other, each of the plurality of second patterns being formed between one of the plurality of first patterns and another one of the plurality of first patterns in the moving direction thereby forming a combined pattern;
    a detecting section that detects the plurality of first patterns and the plurality of second patterns formed on the object, thereby obtaining detection results; and
    a correcting section that corrects the image forming position in the first direction based on the detection results of the plurality of first patterns, and that corrects the image forming position in the second direction based on the detection results of the plurality of second patterns.

2. The image forming apparatus according to claim 1, wherein the plurality of first patterns is separated by the plurality of second patterns in such a manner that an equal number of first pattern is arranged between one of the plurality of second patterns and another one of the plurality of second patterns.

3. The image forming apparatus according to claim 2, wherein the plurality of first patterns and the plurality of second patterns are arranged alternately by an equal number in the moving direction.

4. The image forming apparatus according to claim 1, wherein the object is an image bearing member that is movable circularly and that has a circumferential length; and
    wherein the calibration pattern has an overall length that is longer than or equal to the circumferential length.

5. The image forming apparatus according to claim 1, wherein each of the plurality of first patterns and the plurality of second patterns has an outer shape that extends in a same direction.

6. The image forming apparatus according to claim 5, wherein each of the plurality of first patterns and the plurality of second patterns extends in a direction perpendicular to the moving direction.

7. The image forming apparatus according to claim 1, wherein the first direction is a main scanning direction perpendicular to the moving direction;
    wherein the second direction is a sub-scanning direction in parallel with the moving direction; and
    wherein the plurality of second patterns includes a plurality of single-color patterns having single colors different from each other.

8. The image forming apparatus according to claim 1, wherein the detecting section comprises an optical sensor that is capable of detecting both the plurality of first patterns and the plurality of second patterns.

9. The image forming apparatus according to claim 8, wherein all of the plurality of first patterns and the plurality of second patterns have a same size in the moving direction.

10. The image forming apparatus according to claim 9, wherein the detecting section detects the plurality of first patterns based on a first threshold value, and detects the plurality of second patterns based on a second threshold value different from the first threshold value.

11. The image forming apparatus according to claim 1, wherein each of the at least one pair of marks is a combination of a black mark and a chromatic-color mark.

12. The image forming apparatus according to claim 1, further comprising a storage section that stores correlation data between phase differences and deviation amounts of image forming positions, the phase differences being differences of phase between sample waveforms and a reference waveform, wherein the detecting section detects amounts of reflected light from the plurality of first patterns, and obtains pulse waveforms based on the amounts of reflected light, the amounts of reflected light differing depending on the mark overlapping degree, the pulse waveforms having pulse widths differing depending on the mark overlapping degree;

wherein the detecting section obtains a sample waveform based on the pulse widths;

wherein the correcting section obtains a phase difference between the sample waveform obtained by the detecting section and the reference waveform, and obtains a deviation amount based on the phase difference and the correlation data; and wherein the image forming section performs subsequent image forming operations based on the deviation amount obtained by the correcting section.

\* \* \* \* \*